United States Patent
Mani et al.

(10) Patent No.: US 12,445,362 B2
(45) Date of Patent: Oct. 14, 2025

(54) COMMUNICATION VISUALIZATION AND ANALYTICS SYSTEM FOR PUBLIC CLOUDS

(71) Applicant: Microsoft Technology Licensing, LLC, Redmond, WA (US)

(72) Inventors: Sathiya Kumaran Mani, Kirkland, WA (US); Tsuwang Hsieh, Sammamish, WA (US); Ranveer Chandra, Kirkland, WA (US); Srikanth Kandula, Redmond, WA (US); Santiago Martin Segarra, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 18/476,913

(22) Filed: Sep. 28, 2023

(65) Prior Publication Data

US 2025/0112843 A1    Apr. 3, 2025

(51) Int. Cl.
*H04L 43/045* (2022.01)
*H04L 41/12* (2022.01)
(Continued)

(52) U.S. Cl.
CPC ............ *H04L 43/045* (2013.01); *H04L 41/12* (2013.01); *H04L 41/16* (2013.01); *H04L 43/08* (2013.01); *H04L 43/55* (2022.05)

(58) Field of Classification Search
CPC ....... H04L 43/045; H04L 41/12; H04L 41/16; H04L 43/08; H04L 43/55
See application file for complete search history.

(56) References Cited

U.S. PATENT DOCUMENTS

| | | | |
|---|---|---|---|
| 2021/0314232 A1* | 10/2021 | Nainar | H04L 41/12 |
| 2024/0163169 A1* | 5/2024 | Dankner | H04L 41/0869 |
| 2024/0356853 A1* | 10/2024 | Ghosh | H04L 47/12 |

OTHER PUBLICATIONS

"Advanced Persistent Threats and Nation-State Actors", Retrieved From: https://www.cisa.gov/topics/cyber-threats-and-advisories/advanced-persistent-threats-and-nation-state-actors, Retrieved From: Jul. 6, 2023, 7 Pages.

(Continued)

*Primary Examiner* — Tonia L Dollinger
*Assistant Examiner* — Joseph M Cousins
(74) *Attorney, Agent, or Firm* — NovoTechIP International PLLC

(57) ABSTRACT

Securing and optimizing communications for a cloud service provider includes collecting connection summary information at network interface devices associated with host computing devices for a group of resources allocated to a customer of the cloud computing environment. The connection summary information includes local address information, remote address information, and data information, each connection established via the network interface devices. At least one communication graph is generated for the group of resources using the connection summary information. The graph includes nodes that represent communication resources of the group of resources and edges extending between nodes that characterize communication between the nodes. At least one analytics process is performed on data from the graph to identify at least one of a micro-segmentation strategy, a communication pattern, and a flow prediction for the group of resources.

20 Claims, 13 Drawing Sheets

(51) Int. Cl.
    *H04L 41/16*    (2022.01)
    *H04L 43/08*    (2022.01)
    *H04L 43/55*    (2022.01)

(56) References Cited

OTHER PUBLICATIONS

"Akamai Guardicore Segmentation", Retrieved From: https://www.akamai.com/products/akamai-guardicore-segmentation, Retrieved From: Jul. 6, 2023, 11 Pages.

"All Networking Pricing", Retrieved From: https://cloud.google.com/vpc/network-pricing, Retrieved From: Jul. 6, 2023, 81 Pages.

"Amazon Redshift", Retrieved From: https://aws.amazon.com/redshift/, Retrieved From: Jul. 6, 2023, 8 Pages.

"Apache Spark", Retrieved From: https://www.databricks.com/spark/about, Retrieved From: Jul. 6, 2023, 5 Pages.

"Azure Synapse Analytics", Retrieved From: https://learn.microsoft.com/en-us/azure/synapse-analytics/, Retrieved From: Jul. 6, 2023, 4 Pages.

"Bandwidth Pricing", Retrieved From: https://azure.microsoft.com/en-us/pricing/details/bandwidth/, Retrieved From: Jul. 6, 2023, 8 Pages.

"Cisco Adaptive Security Virtual Appliance (ASAv) Data Sheet", Retrieved From: https://www.cisco.com/c/en/us/products/collateral/security/adaptive-security-virtual-appliance-asav/adapt-security-virtual-appliance-ds.html, Jun. 16, 2021, 19 Pages.

"Cisco Tetration", Retrieved From: https://www.cisco.com/c/en_sg/products/data-center-analytics/tetration-analytics/index.html, Retrieved From: Jul. 6, 2023, 27 Pages.

"Data Breach Investigations Report", Retrieved From: https://www.verizon.com/business/resources/reports/dbir/., Retrieved From: Jul. 6, 2023, 8 Pages.

"FortiGate-VM on Amazon Web Services", Retrieved From: https://www.fortinet.com/content/dam/fortinet/assets/data-sheets/FortiGate_VM_AWS.pdf, Aug. 18, 2023, 10 Pages.

"Horizontal Pod Autoscaling", Retrieved From: https://kubernetes.io/docs/tasks/run-application/horizontal-pod-autoscale/, Jul. 25, 2023, 9 Pages.

"How Resilient Is Your Network to Advanced Threats?", Retrieved From: https://www.akamai.com/infectionmonkey/breach-and-attack-simulation, Retrieved From: Jul. 6, 2023, 11 Pages.

"Intel Tofino", Retrieved From: https://www.intel.com/content/www/us/en/products/details/network-io/intelligent-fabric-processors/tofino.html, Retrieved From: Jul. 6, 2023, 3 Pages.

"Intel Tofino 2", Retrieved From: https://www.intel.com/content/www/us/en/products/network-io/programmable-ethernet-switch/tofino-2-series.html#:~:text=Intel%C2%AE%20Tofino%E2%84%A2%202%20delivers%20up%20to%2012.8%20Tb,P4-programmable%20Ethernet%20switch%20ASICs., Retrieved From: Jul. 6, 2023, 3 Pages.

"Logging IP Traffic using VPC Flow Logs", Retrieved From: https://docs.aws.amazon.com/vpc/latest/userguide/flow-logs.html., Retrieved From: Jul. 6, 2023, 14 Pages.

"Microsegmentation—Global Strategic Business Report", Retrieved From: https://www.researchandmarkets.com/report/microsegmentation, Mar. 2023, 6 Pages.

"Sklearn.Decomposition.FastICA", Retrieved From: https://scikit-learn.org/stable/modules/generated/sklearn.decomposition.FastICA.html, Retrieved From: Jul. 6, 2023, 6 Pages.

"Using NetFlow Filtering or Sampling to Select the Network Traffic to Track", Retrieved From: https://www.cisco.com/c/en/us/td/docs/ios-xml/ios/netflow/configuration/15-mt/nf-15-mt-book/nflow-filt-samp-traff.html, Nov. 24, 2014, 37 Pages.

"VM-Series", Retrieved From: https://docs.paloaltonetworks.com/vm-series, Retrieved From: Jul. 6, 2023, 7 Pages.

"VMware NSX", Retrieved From: https://www.vmware.com/products/nsx.html, Retrieved From: Jul. 6, 2023, 6 Pages.

"VPC Flow Logs", Retrieved From: https://cloud.google.com/vpc/docs/flow-logs, Retrieved From: Jul. 6, 2023, 29 Pages.

"What is an Advanced Persistent Threat?", Retrieved From: https://www.crowdstrike.com/cybersecurity-101/advanced-persistent-threat-apt/., Feb. 28, 2023, 11 Pages.

"Zero Trust: The Security Paradigm for the Modern Organization", Retrieved From: https://www.illumio.com/solutions/zero-trust, Retrieved From: Jul. 6, 2023, 6 Pages.

Antonellis, et al., "Simrank++: Query Rewriting through Link Analysis of the Click Graph (Poster)", In Proceedings of the 17th international conference on World Wide Web, Apr. 21, 2008, pp. 1177-1178.

Bahl, et al., "Towards Highly Reliable Enterprise Network Services via Inference of Multi-level Dependencie", In Journal of ACM SIGCOMM Computer Communication Review, vol. 37, Issue 4, Aug. 27, 2007, pp. 13-24.

Bailey, et al., "Microsoft Azure: The Ultimate Flexible Enterprise-Level Solution", Retrieved From: https://www.microsoft.com/en-us/research/wp-content/uploads/2016/09/Microsoft-Azure-The-Ultimate-Flexible-EnterpriseLevel-Solution.pdf, Retrieved From: Jul. 6, 2023, 32 Pages.

Balkan, et al., "GoogleCloudPlatform / Microservices-demo Public", Retrieved From: https://github.com/GoogleCloudPlatform/microservices-demo, Jun. 16, 2023, 6 Pages.

Ballani, et al., "Off by Default!", In Proceedings of Twenty-first ACM Workshop on Hot Topics in Networks, 2005, 6 Pages.

Bansal, et al., "Disaggregating Stateful Network Functions", In Proceedings of 20th USENIX Symposium on Networked Systems Design and Implementation, Apr. 17, 2023, pp. 1469-1487.

Blondel, et al., "Fast Unfolding of Communities in Large Networks", In Journal of Statistical Mechanics: Theory and Experiment, Issue 10, Oct. 9, 2008, 12 Pages.

Broder, Andreiz., "On the Resemblance and Containment of Documents", In Proceedings of the Compression and Complexity of Sequences IEEE Computer Society, Jun. 13, 1997, pp. 21-29.

Carbone, et al., "Apache Flink™: Stream and Batch Processing in a Single Engine", In Journal of the Bulletin of the Technical Committee on Data Engineering, vol. 38, Issue 4, Mar. 2015, pp. 28-38.

Casado, et al., "Ethane: Taking Control of the Enterprise", In Journal of ACM SIGCOMM Computer Communication Review, vol. 37, Issue 4, Aug. 27, 2007, pp. 1-12.

Cranor, et al., "Gigascope: A Stream Database for Network Applications", In Proceedings of the 2003 ACM SIGMOD international conference on Management of data, Jun. 9, 2003, pp. 647-651.

Cranor, et al., "Gigascope: High Performance Network Monitoring with an SQL Interface", In Proceedings of the ACM SIGMOD International Conference on Management of Data, Jun. 3, 2002, 623 Page.

Cranor, et al., "The Gigascope Stream Database", In Journal of Bulletin of the IEEE Computer Society Technical Committee on Data Engineering, vol. 26, Issue 1, Mar. 2003, pp. 27-32.

Devlin, et al., "BERT: Pre-training of Deep Bidirectional Transformers for Language Understanding", In Proceedings of NAACL-HLT, Jun. 2, 2019, pp. 4171-4186.

Ertl, Otmar, "SuperMinHash—A New Minwise Hashing Algorithm for Jaccard Similarity Estimation", In repository of arXiv: 1706.05698v1, Jun. 18, 2017, 6 Pages.

Estan, et al., "Automatically Inferring Patterns of Resource Consumption in Network Traffic", In Proceedings of the conference on Applications, technologies, architectures, and protocols for computer communications, Aug. 25, 2003, pp. 137-148.

Evans, Bob, "Walmart CIO: We Picked Microsoft for Huge Cloud Deal to Accelerate Digital Transformation", Retrieved From: https://www.forbes.com/sites/bobevans1/2018/07/18/walmart-cio-we-picked-microsoft-for-huge-cloud-deal-to-accelerate-digital-transformation/?sh=63d41054491c, Jul. 18, 2018, 7 Pages.

Firestone, et al., "Azure Accelerated Networking: SmartNICs in the Public Cloud", In Proceedings of 15th USENIX Symposium on Networked Systems Design and Implementation, Apr. 9, 2018, pp. 51-66.

Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

(56) References Cited

OTHER PUBLICATIONS

Guo, et al., "Pingmesh: A Large-Scale System for Data Center Network Latency Measurement and Analysis", In Proceedings of the 2015 ACM Conference on Special Interest Group on Data Communication, Aug. 17, 2015, pp. 139-152.
He, et al., "Deep Residual Learning for Image Recognition", In Proceedings of the IEEE Conference on Computer Vision and Pattern Recognition, Jun. 27, 2016, pp. 770-778.
Henderson, et al., "RolX: Structural Role Extraction & Mining in Large Graphs", In Proceedings of the 18th ACM SIGKDD International Conference on Knowledge Discovery and Data Mining, Aug. 12, 2012, pp. 1231-1239.
Ho, Vanessa, "A new Walmart 'Cloud Factory' will Accelerate Digital Innovation, Boost Business Efficiency", Retrieved From: https://news.microsoft.com/transform/new-walmart-cloud-factory-innovation-business-efficiency/, Nov. 5, 2018, 9 Pages.
Iliofotou, et al., "Network Monitoring using Traffic Dispersion Graphs (TDGs)", In Proceedings of the 7th ACM SIGCOMM Conference on Internet Measurement, Oct. 24, 2007, pp. 315-320.
Jacobson, et al., "OpenNF: Enabling Innovation in Network Function Control", In Journal of ACM SIGCOMM Computer Communication Review, vol. 44, Issue 4, Aug. 17, 2014, pp. 163-174.
Zhao, et al., "Scalable Tail Latency Estimation for Data Center Networks", In Proceedings of the 20th USENIX Symposium on Networked Systems Design and Implementation, Apr. 17, 2023, pp. 685-702.
Jeh, et al., "SimRank: A Measure of Structural-Context Similarity", In Proceedings of the Eighth ACM SIGKDD International Conference on Knowledge Discovery and Data Mining, Jul. 23, 2002, pp. 538-543.
Kandula, et al., "The Nature of Data Center Traffic: Measurements & Analysis", In Proceedings of the 9th ACM SIGCOMM conference on Internet measurement, Nov. 4, 2009, pp. 202-208.
Kandula, et al., "What's Going On? Learning Communication Rules in Edge Networks", In Proceedings of the ACM SIGCOMM conference on Data communication, Aug. 17, 2008, pp. 87-98.
Kazwini, et al., "Flow Logging for Network Security Groups", Retrieved From: https://learn.microsoft.com/en-us/azure/network-watcher/network-watcher-nsg-flow-logging-overview, May 24, 2023, 19 Pages.
Koponen, et al., "Network Virtualization in Multi-tenant Datacenters", In Proceedings of 11th USENIX Symposium on Networked Systems Design and Implementation, Apr. 2, 2014, pp. 203-216.
Lakhina, et al., "Mining Anomalies using Traffic Feature Distributions", In Journal of ACM SIGCOMM Computer Communication Review, vol. 35, Issue 4, Aug. 22, 2005, pp. 217-228.
Li, et al., "FlowRadar: A Better NetFlow for Data Centers", In Proceedings of 13th USENIX Symposium on Networked Systems Design and Implementation, Mar. 16, 2016, pp. 311-324.
Lizorkin, et al., "Accuracy Estimate and Optimization Techniques for SimRank Computation", In Proceedings of the VLDB Endowment, vol. 1, Issue 1, Aug. 23, 2008, pp. 422-433.
Mirsky, et al., "Kitsune: An Ensemble of Autoencoders for Online Network Intrusion Detection", In repository of arXiv:1802.09089v2, May 27, 2018, 15 Pages.
Mogul, et al., "Experiences with Modeling Network Topologies at Multiple Levels of Abstraction", In Proceedings of 17th USENIX Symposium on Networked Systems Design and Implementation, Feb. 25, 2020, pp. 403-418.
Pal, et al., "Overview of Data Transfer Costs for Common Architectures", Retrieved From: https://aws.amazon.com/blogs/architecture/overview-of-data-transfer-costs-for-common-architectures/, Jun. 30, 2021, 9 Pages.
Perozz, et al., "DeepWalk: Online Learning of Social Representations", In Proceedings of the 20th ACM SIGKDD International Conference on Knowledge Discovery and Data Mining, Aug. 24, 2014, pp. 701-710.
Pfaff, et al., "The Design and Implementation of Open vSwitch", In Proceedings of 12th USENIX Symposium on Networked Systems Design and Implementation, May 4, 2015, pp. 117-130.
Rawashdeh, et al., "Similarity Measure for Social Networks—A Brief Survey", In Journal of Maics, vol., Apr. 25, 2015, 7 Pages.
Roy, et al., "Inside the Social Network's (Datacenter) Network", In Proceedings of the 2015 ACM Conference on Special Interest Group on Data Communication, Aug. 17, 2015, pp. 123-137.
Singh, et al., "Packet Classification using Multidimensional Cutting", In Proceedings of the 2003 Conference on Applications, Technologies, Architectures, and Protocols for Computer Communications, Aug. 25, 2003, pp. 213-224.
"Data Breach Investigations Report: 2008-2022", Retrieved From: https://www.verizon.com/business/resources/reports/2022/dbir/2022-data-breach-investigations-report-dbir.pdf, Retrieved date: Jul. 6, 2023, 108 Pages.
"Data Breach Investigations Report 2023", Retrieved From: https://www.verizon.com/business/resources/reports/dbir/., Retrieved From: Jul. 6, 2023, 89 Pages.

\* cited by examiner

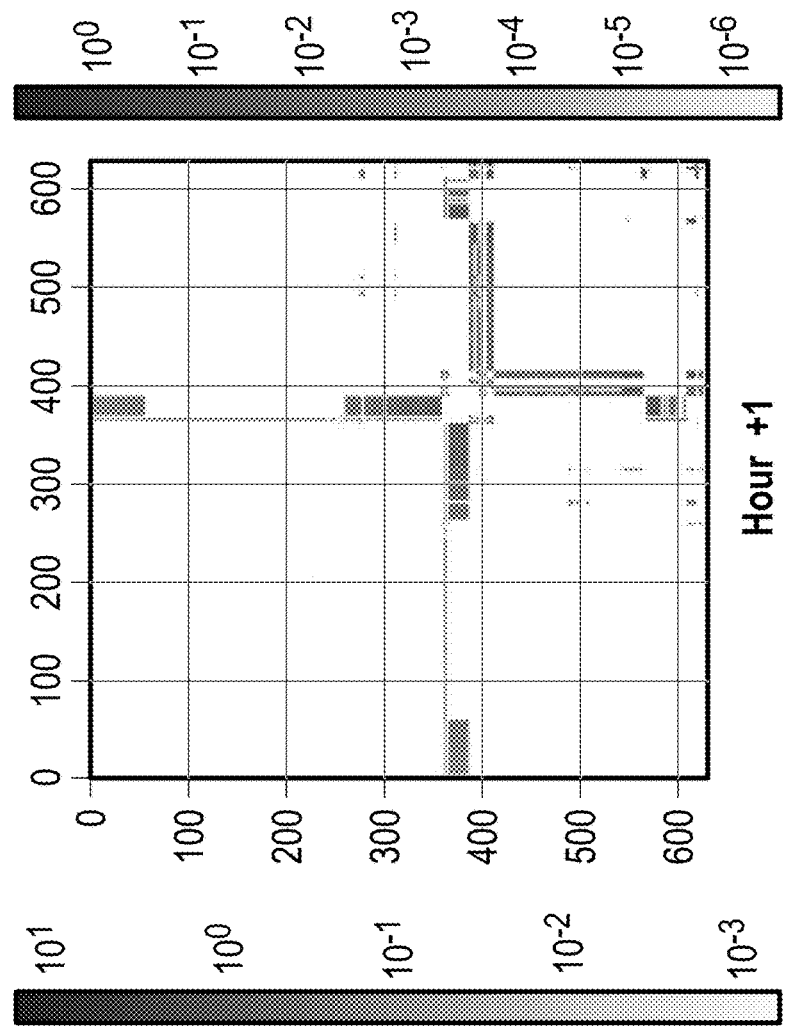
FIG. 8A Hour +1
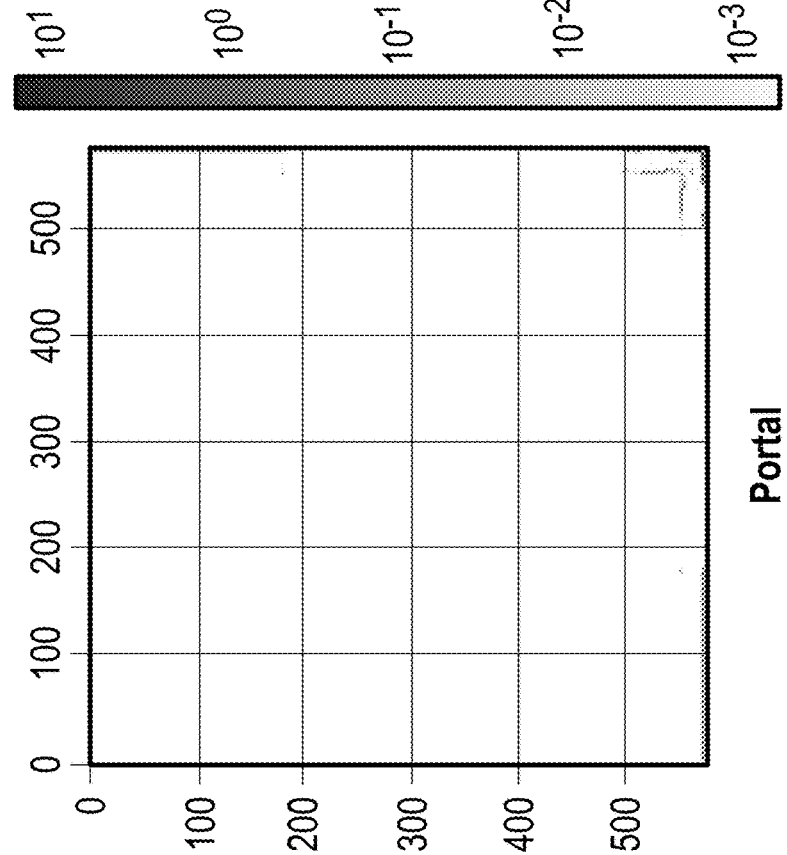
FIG. 7C Portal

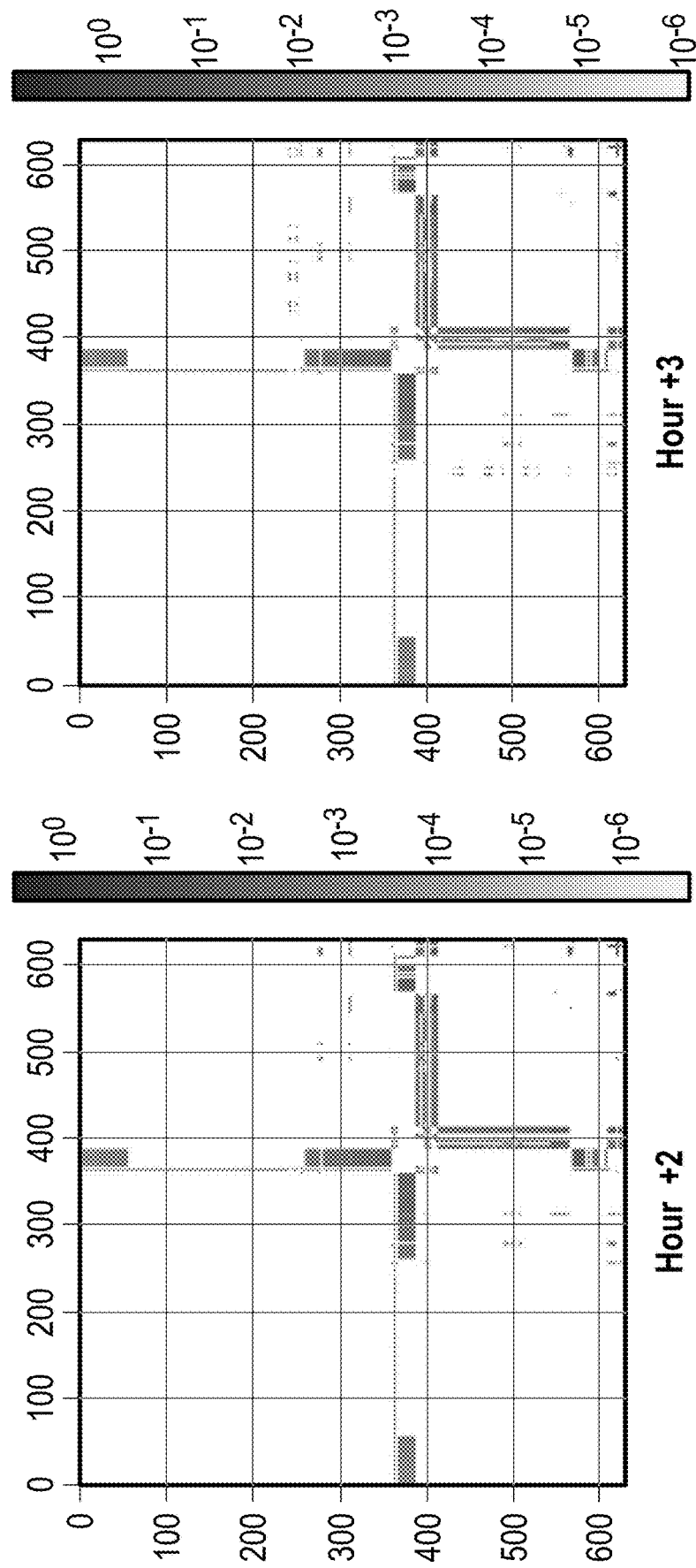
FIG. 8C Hour +3
FIG. 8B Hour +2

COMMUNICATION VISUALIZATION AND ANALYTICS SYSTEM FOR PUBLIC CLOUDS

BACKGROUND

A public cloud is a cloud computing environment in which computing services, including virtual machines (VMs), storage, databases, networking, software, analytics, and the like, are offered by third-party providers over the internet and shared between multiple customers or organizations who want to use them. A public cloud enables customers to utilize services and applications without having to own the computing resources required to run the services and applications locally. Cloud computing resources are typically allocated to customers according to a subscription which defines number(s) and type(s) of resources to allocated to a customer.

As more and more organizations transition their workloads to public clouds, finding ways to improve network security and optimize network communications for customers of cloud platforms has become increasingly important. Such improvements and optimizations could be facilitated by a comprehensive view of the workings of the communications amongst the resources within a subscription. However, it has been difficult to find a means of obtaining a suitable view of the communications within a subscription that does not adversely impact the cost and/or performance of the resources.

Hence, what is needed are systems and methods of obtaining a comprehensive view of communications within a subscription that have minimal impact on the computing resources of the subscription.

SUMMARY

In one general aspect, the instant disclosure presents a communication analytics system having a processor and a memory in communication with the processor wherein the memory stores executable instructions that, when executed by the processor alone or in combination with other processors, cause the communication analytics system to perform multiple functions. The function may include using network interface devices of host computing devices for a group of resources allocated to a customer of the cloud computing environment to monitor connections established via the network interface devices and record connection summary information for each of the connections, the connection summary information including local address information, remote address information, and data information for each the connections; generating at least one communication graph for the group of resources using the connection summary information, the at least one communication graph including nodes that represent communication resources of the group of resources and edges extending between nodes that characterize communication between the nodes; and performing at least one analytics process on data in the at least one communication graph, the analytics process including at least one of a micro-segmentation strategy, a principal component analysis, and a counterfactual analysis.

In yet another general aspect, the instant disclosure presents a method of graphing and analyzing communications across a cloud service provider. The method includes using network interface devices of host computing devices for a group of resources allocated to a customer of the cloud computing environment to monitor connections established via the network interface devices and record connection summary information for each of the connections, the connection summary information including local address information, remote address information, and data information for each the connections; generating at least one communication graph for the group of resources using the connection summary information, the at least one communication graph including nodes that represent communication resources of the group of resources and edges extending between nodes that characterize communication between the nodes; and performing at least one analytics process on data in the at least one communication graph, the analytics process including at least one of a micro-segmentation strategy, a principal component analysis, and a counterfactual analysis.

In a further general aspect, the instant application describes a non-transitory computer readable medium on which are stored instructions that when executed cause a programmable device to perform functions of using network interface devices of host computing devices for a group of resources allocated to a customer of the cloud computing environment to monitor connections established via the network interface devices and record connection summary information for each of the connections, the connection summary information including local address information, remote address information, and data information for each the connections; generating at least one communication graph for the group of resources using the connection summary information, the at least one communication graph including nodes that represent communication resources of the group of resources and edges extending between nodes that characterize communication between the nodes; and performing at least one analytics process on data in the at least one communication graph to identify at least one of a micro-segmentation strategy, a principal component analysis, and a counterfactual analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 7A-7C show adjacency matrix representations of the bytes exchanged between IP addresses for different datasets.

FIGS. 8A-8C show timelapse of bytes exchanged on the K8s PaaS dataset for three consecutive hours after the hour shown in FIG. 7A.

DETAILED DESCRIPTION

Figure 1:
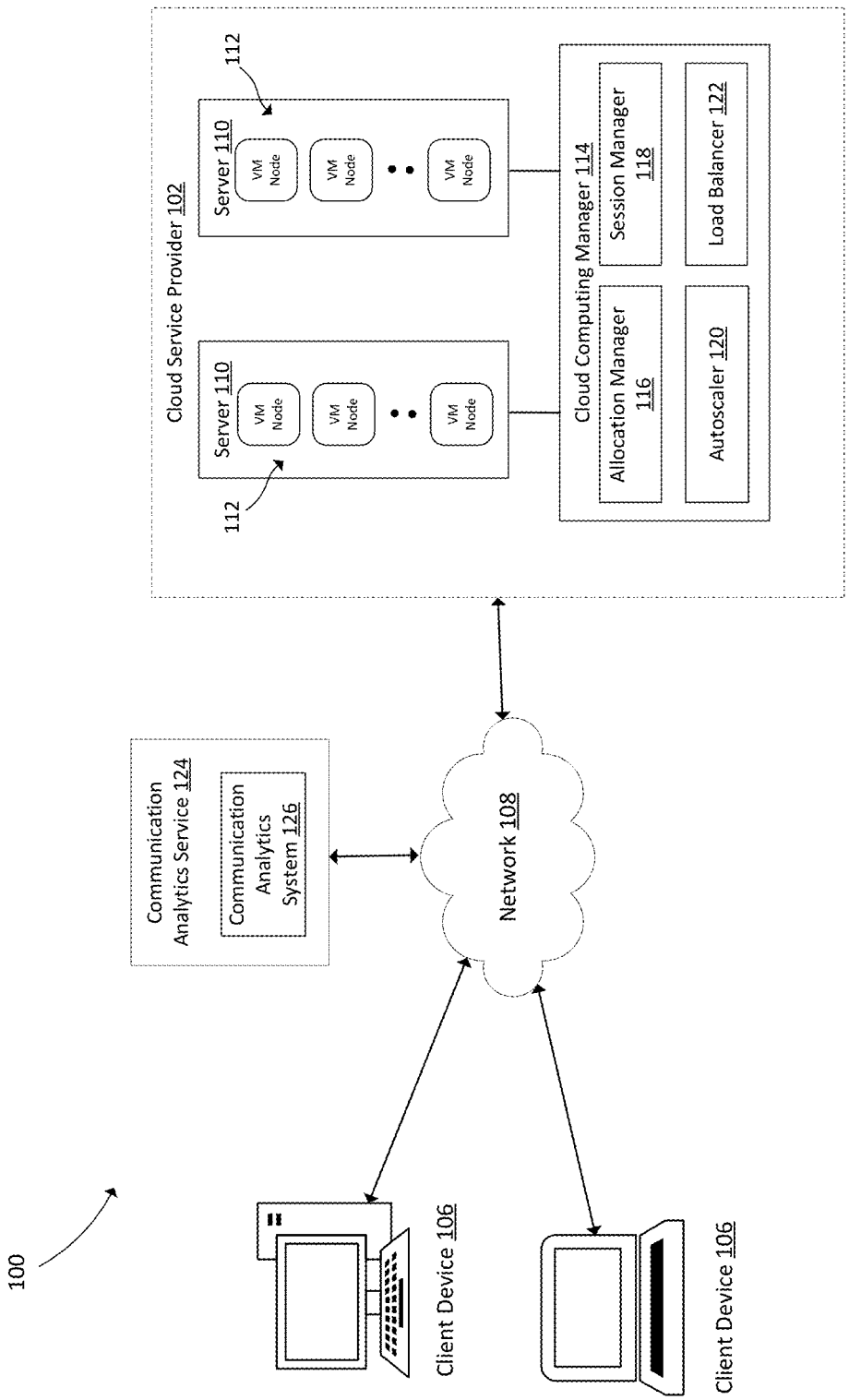
FIG. 1 is a diagram showing an example computing environment in which the techniques disclosed herein are implemented.

A public cloud is a type of cloud computing service that delivers computing resources, such as virtual machines, storage, databases, and various application services, over the internet to multiple tenants using the same underlying infrastructure, also referred to as multi-tenancy. In this context, a "tenant" typically refers to an individual or organization (such as a company or customer) that uses the services and resources of a shared infrastructure but is logically isolated from other tenants. Tenants in turn can use the computing resources of the platform to provide various services and/or applications, such as web hosting, application development and deployment, data storage and backup, disaster recovery, big data analytics, and more.

A cloud computing platform allocates resources and/or services to tenants according to an agreement, such as a subscription, which defines the resources to be allocated, how the resources are to be allocated, and/or a pricing model (e.g., consumption-based, per-user, per-unit, etc.). The term "subscription" can also be used to refer to the logical grouping of resources which have been allocated to a tenant under a subscription. Tenants can have multiple subscriptions with each subscription corresponding to a different group of allocated resources.

As more and more enterprises transition their workloads to public clouds, securing and optimizing network communication for tenants is becoming increasingly important. Cloud computing platforms provide mechanisms for logically isolating tenants and/or subscriptions from each other to maintain the privacy and security of each tenant's or subscription's data and resources. The resources allocated to one tenant, or one subscription, are therefore prevented from directly accessing or communicating with the resources allocated to another tenant or another subscription.

Securing the internal network of a subscription is important because even a single breached resource can open up access to many other resources in a subscription. However, one issue that has made it difficult to improve security and optimize network communications within a subscription is lack of communication visibility. A lack of communication visibility refers to an inability to obtain a comprehensive view of the workings of the communication network within a subscription, such as which resources are in communication with each other, when communications occur between resources, why communications occur, and the like.

One method that could be used to obtain information about network communications within a subscription is to monitor traffic that passes through chokepoints in the network. However, networks within subscriptions typically do not have chokepoints through which all or most of the traffic passes. As a result, obtaining network information in this manner would not work. Another method that could be used to obtain network information is examining the software that is run on the computing resources to derive the information. Most tenants, however, require subscriptions with large numbers of resources (e.g., millions) of different types (e.g., virtual machines (VMs), databases, and resources for handling serverless functions). These resources likely run many different software programs which may be owned or controlled by different teams or departments within an organization. Thus, it would not be feasible to attempt to derive network information in this manner.

To address these technical problems and more, in an example, this description provides technical solutions that improve the visibility of the communications within a subscription and in turn enable comprehensive views of network communications, in the form of communication graphs of the communication within a subscription, to be generated. The solutions utilize a telemetry source available in public clouds, i.e., programmable network interface cards (NICs) which are attached to all hosts in public clouds. Each programmable NIC is programmed to record connection summaries for each connection established via the NIC. Each connection summary includes source and destination IP addresses and port numbers, number of packets transmitted and received, and number of bytes transmitted for a connection and a time stamp at which information was last collected/updated. This telemetry data can be collected transparently from customers and with minimal impact on their workloads.

Connection summaries are periodically collected from all NICs and forwarded to a visualization and analytics system where the connection information is used to generate complete and dynamic communication graphs of the communication inside cloud subscriptions. Each node in a graph corresponds to an IP address, service, Kubernetes pod, {(IP, port)} tuple, or the like. Each edge represents communication between nodes, e.g., the number of packets, bytes, and connections. Connection summaries are continuously updated (e.g., once a minute) which enables dynamic views of the communication within a subscription. For example, time-series of graphs can be generated to show communications over time. Alternatively, time-series data can be embedded in the node and/or edge attributes of a graph. The graphs are capable of capturing information at different timescales and different granularities which enables a multi-faceted view of the internal communication that in turn enables discovery of meaningful patterns and rich analyses of data. Such communication graphs enable analysis techniques, such as micro-segmentation analysis, principal component analysis (PCA), and counterfactual analysis, to be performed to obtain information and insights regarding the communication within subscriptions that would otherwise not be possible without the graphs.

FIG. 1 shows an example cloud computing environment 100, upon which aspects of this disclosure may be implemented. The cloud computing environment 100 includes a cloud service provider 102, client devices 106, and a network 108. The cloud service provider 102 includes computing resources which can be allocated to customers and accessed via the network 108. Resources are allocated to a customer according to an agreement between the customer and the cloud service provider, referred to as a subscription. The subscription defines the resources allocated to a customer and can be used to refer to the logical grouping of resources allocated to a customer.

In the example of FIG. 1, cloud service provider 102 includes servers 110 that provide computing resources, such as VM nodes 112, which can be used to implement one or more services and/or applications that can be hosted online and accessed via the network 108. Servers 110 may be organized in farms, clusters, racks, containers, data centers, geographically disperse facilities, and the like, and may communicate with each other via a variety of types of networks. Two servers 110 are shown as part of the public cloud 102 of FIG. 1, although any suitable number of servers may be utilized. Each server 110 is configured to provide one or more virtual machine (VM) nodes 112 which may be allocated to customers.

Cloud service provider 102 includes a cloud computing manager 114 for managing resources of the cloud infrastructure 102. The cloud computing manager 114 is configured to deploy, configure and/or manage servers 110, VM nodes 112, and other resources of the platform. The cloud computing manager 114 includes an allocation manager 116 that is configured to manage allocation of resources to customers. The allocation manager 116 receives requests for allocation of computing resources from customers. The requests identify one or more resources, resource types, and/or pricing models of resources requested for allocation.

In embodiments, allocation manager 116 organizes active VM nodes 112 into one or more VM pools depending on various factors, such as the type of request(s) handled by the VM nodes, VM allocation type, and the like. The VM nodes allocated to a customer may be included in a single VM pool or distributed among multiple VM pools. The allocation manager 116 is configured to allocate VM nodes and/or VM pools to customers/services in accordance with allocation requests and to track which VM nodes and/or VM pools are currently allocated to which customers. The allocation manager 116 is also configured to allocate additional VM nodes, remove (or evict) VM nodes, provision additional VM nodes, and decommission VM nodes as needed to comply with resource requests, contracts, service level agreements (SLAs), requirements associated with allocation types and/or pricing model, and any other guidelines or constraints associated with VM allocations.

The cloud computing manager 114 includes an autoscaler 120 configured to automatically scale the VM nodes 112 provided by the cloud service provider 102 to accommodate changes in demand or load on the resources of the platform. The cloud computing manager 114 also includes a load balancer 122 for balancing the load on the platform between the servers 110 and VM nodes 112 by directing requests for services to different servers 110 and VM nodes 112 in an effort to balance out resource utilization across multiple physical and/or virtual computing resources.

Client devices 106 enable users to access resources provided by the cloud service provider 102. Client devices 106 may comprise any suitable type of computing device that enables a user to interact with various applications. Examples of suitable computing devices include but are not limited to personal computers, desktop computers, laptop computers, mobile telephones, smart phones, tablets, phablets, smart watches, wearable computers, gaming devices/computers, televisions, and the like. Client devices 106 and cloud service provider 102 communicate via network 108. Network 108 may include one or more wired/wireless communication links and/or communication networks, such as a PAN (personal area network), a LAN (local area network), a WAN (wide area network), or a combination of networks, such as the Internet.

Figure 2A:
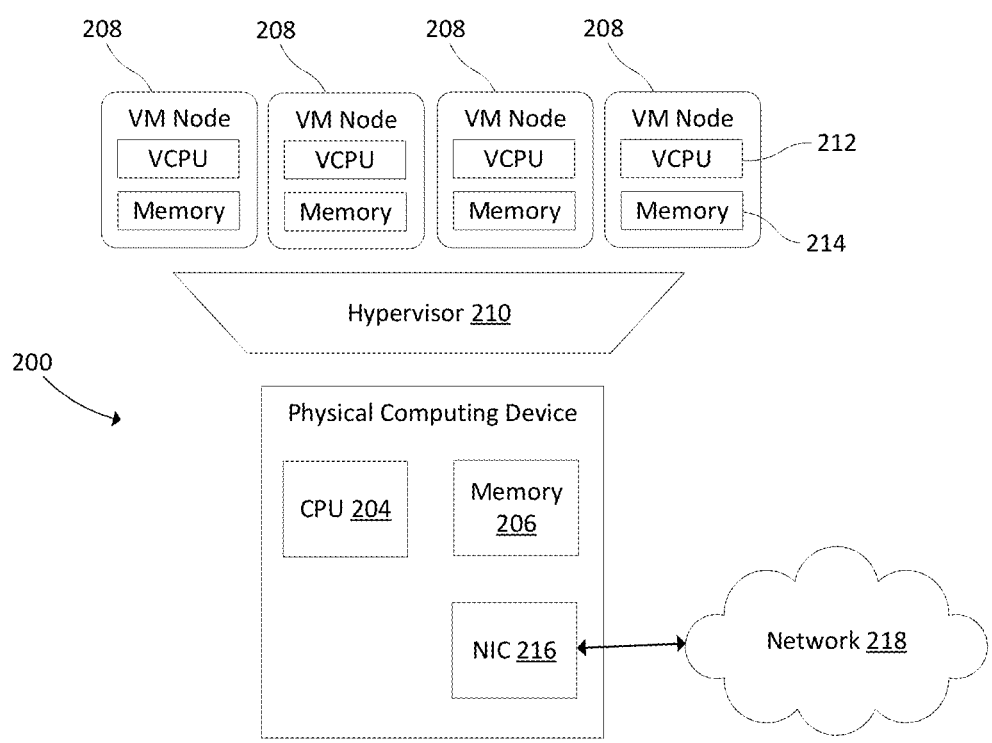
FIG. 2A shows an example of a computing device for providing virtual machine nodes for a cloud service provider, such as the cloud service provider of FIG. 1.

Each server 110 includes one or more physical computing devices for hosting the VM nodes 112. FIG. 2A shows an example of such a computing device 200. Computing device 200 may be any of a variety of different types of computing devices. For example, computing device 200 may be a desktop computer, a server computer, a laptop, and the like. Computing device 200 includes physical resources, such as a central processing unit (CPU) 204 and memory 206. Computing device 200 may include other components not shown, such as network interface devices, disk storage, input/output devices, and the like. The CPU 204 may be any type or brand of CPU. The memory 206 may include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 204. Though computing device 200 is shown as having only one CPU 204 and one memory 206, a computing device may include any suitable number of processors and/or memories.

Computing device 200 is a host device, and, as such, is configured to host one or more virtual machine nodes 208. To this end, computing device 200 includes a hypervisor 210 configured to generate, monitor, terminate, and/or otherwise manage VM nodes 208. Hypervisor 210 is software, firmware and/or hardware that emulates virtual resources for the VM nodes 208 using the physical resources 204, 206 of the computing device 200. More specifically, hypervisor 210 allocates processor time, memory, and disk storage space for each VM node 208. The hypervisor 210 also provides isolation between the VM nodes 208 such that each VM node 208 can include its own operation system and run its own programs.

VM nodes 208 are software implementations of physical computing devices that can each run programs analogous to physical computing devices. Each VM node 208 may include virtual resources, such as virtual processor (VCPU) 212 and virtual memory 214 and may be configured to implement a guest operating system. The VCPU 212 is implemented as software with associated state information that provide a representation of a physical processor with a specific architecture. Different VM nodes 208 may be configured to emulate different types of processors. For example, one VM node may have a virtual processor having characteristics of an Intel x86 processor, whereas another virtual machine node may have the characteristics of a PowerPC processor. Guest operating system may be any operating system such as, for example, operating systems from Microsoft®, Apple®, Unix, Linux, and the like. Guest operating system may include user/kernel modes of operation and may have kernels that can include schedulers, memory managers, etc. Each guest operating system may have associated file systems implemented in virtual memory and may schedule threads for executing applications on the virtual processors. Applications may include applications for processing client requests and/or implementing functionality of the server.

The hypervisor 210 enables multiple VM nodes 208 to be implemented on computing device 200 by allocating portions of the physical resources 204, 206 of the computing devices 202, such as processing time, memory, and disk storage space, to each VM node 208. Hypervisor 210 may be configured to implement any suitable number of VM nodes 208 on the computing device 200. The hypervisor 210 of FIG. 2A is shown as having instantiated four VM nodes 208 although computing devices are generally capable of supporting more VM nodes. Hypervisor 210 may be configured to instantiate any suitable number of VM nodes 208 on computing device 200 depending on various factors, such as hardware configuration, software configuration, application, and the like.

The computing device includes a network interface card (NIC) 216. The primary function of the NIC 216 is to provide a physical interface for connecting the computing device 200 to a network 218, whether it's a local area network (LAN), wide area network (WAN), or the Internet. The NIC 216 is responsible for handling the framing, addressing, and access to the physical medium (e.g., Ethernet, Wi-Fi) for transmitting and receiving data packets. The NIC 216 can be integrated into the computing device or provided as a peripheral component for the computing device.

Returning to FIG. 1, the cloud computing environment 100 includes a communication analytics service 124 that provides a cloud communication analytics service over the network 108. The communication analytics service 124 includes a communication analytics system 126 capable of generating visualizations of the communications across the network of a cloud service provider, and in particular, the communications within subscriptions handled by a cloud service provider. In FIG. 1, the analytics service 124 is shown as being separate from the cloud service provider 102. In some implementations, the analytics service 124 can be implemented as a service provided by the cloud service provider 102. The communication analytics system 126 makes use of connection summaries that are recorded at NICs which are attached to all hosts in public clouds. The connection summaries describe every connection established via the NICs. The connection summaries are periodically collected by the communication analytics system 126 and used as the basis for generating complete and dynamic graphs of the communication inside cloud subscriptions.

Figure 3A:
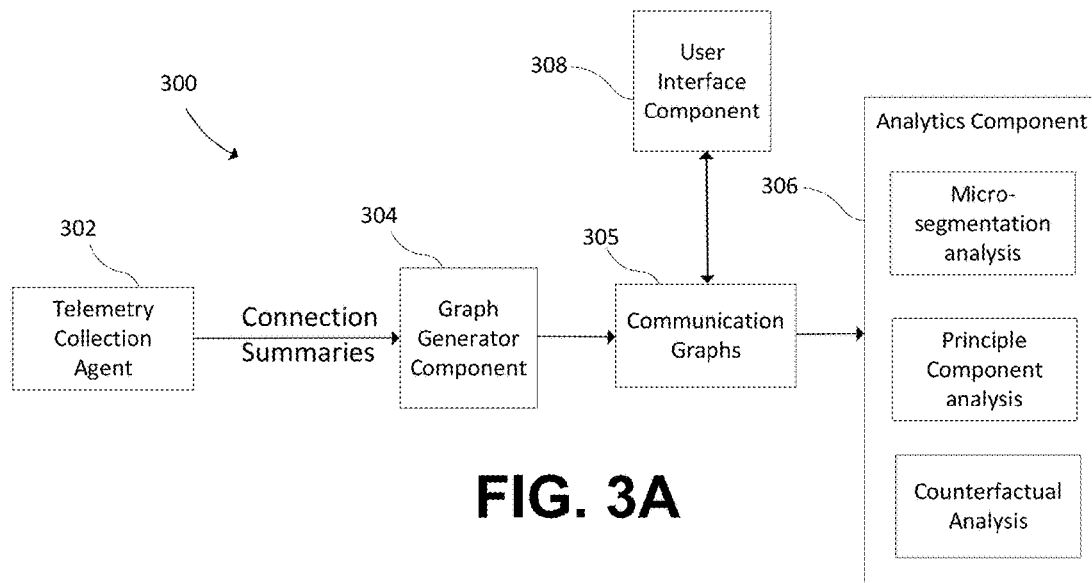
FIG. 3A shows an example implementation of a communication visualization and analytics system for a cloud service provider, such as the cloud service provider of FIG. 1.

An example implementation of a communication analytics system 300 is shown in FIG. 3A. The communication analytics system 300 includes a telemetry collection agent 302, a graph generator component 304, an analytics component 306, and a user interface component 308. The telemetry collection agent 302 is a software program that is ran in host computing devices to periodically retrieve connection summaries recorded by the programmable NICs associated with the computing devices and to communicate the connection summaries to the graph generator component 304.

Figures 2B, 2C:
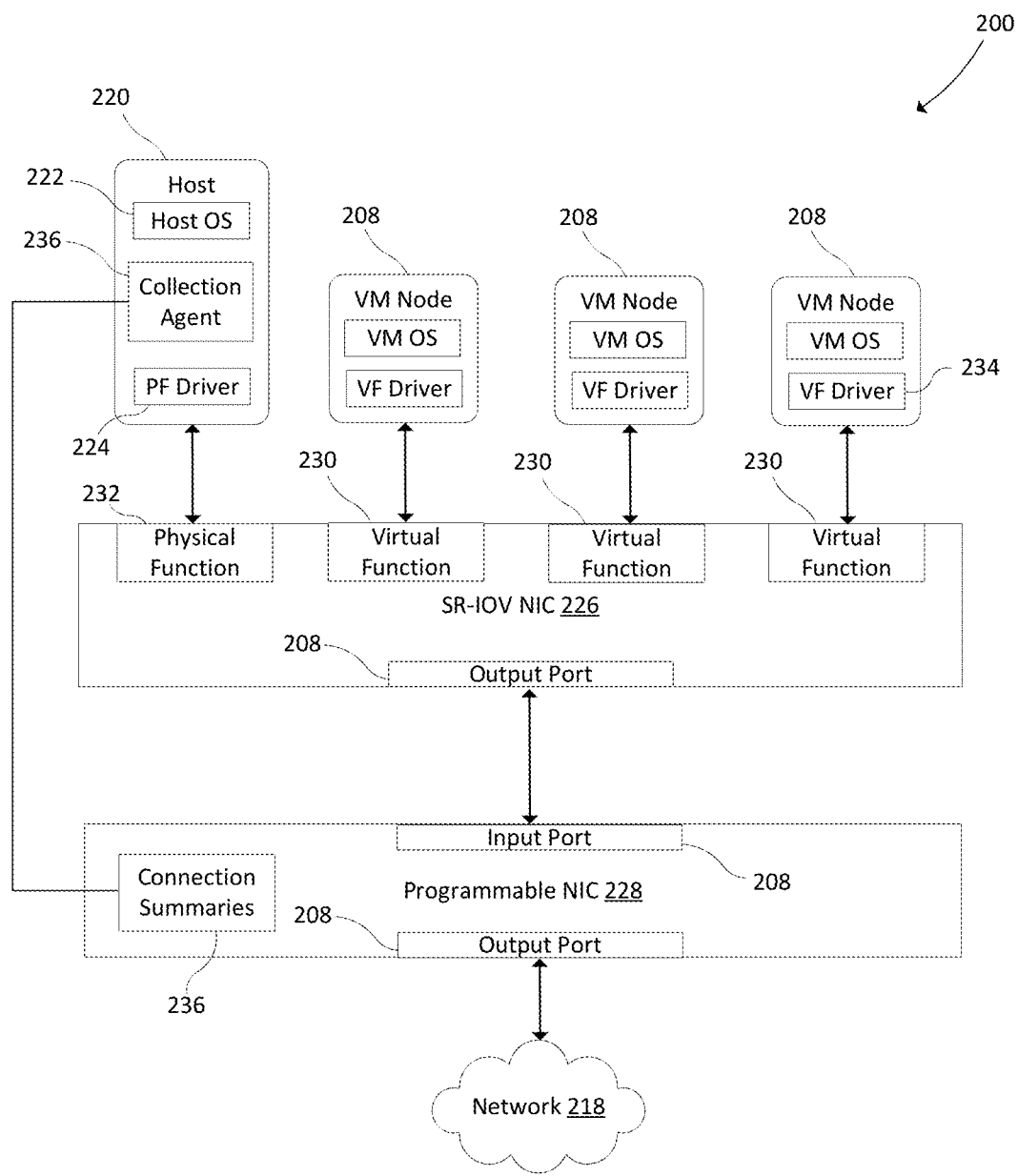
FIG. 2B shows an example implementation of the network interfaces for the computing device of FIG. 2A.
FIG. 2C shows an example schema for a connection summary which is collected for each connection and used to generate communication graphs for visualizing the communications within a subscription.

FIG. 2B shows an example implementation of the network interface for the computing device 200 of FIG. 2A that includes a collection agent 236. The computing device 200 includes a host 220, VM nodes 208, a NIC 226, and a programmable NIC 228. The NIC 226 is implemented by a single-root I/O virtualization (SR-IOV) NIC. SR-IOV is a specification that allows a single Peripheral Component Interconnect Express (PCIe) physical device under a single root port to appear as multiple separate physical devices to the hypervisor or the guest operating system. SR-IOV uses physical functions 232 and virtual functions 230 to manage global functions for the SR-IOV NIC. Physical functions 232 are full PCIe functions that are capable of configuring and managing SR-IOV functionality. The host 220 includes a PF driver 224 for managing communication with the physical function 232. It is possible to configure or control PCIe devices using the physical function 232, and the physical function 232 has the ability to move data in and out of the device. Virtual functions 230 are lightweight PCIe functions that support data flowing but have a restricted set of configuration resources. Each VM 208 includes a VF driver 234 for managing communications with the corresponding virtual function 230.

The programmable NIC 228, or smart NIC, is a network interface that includes integrated accelerators. Programmable NICs optimize latency, encryption, and packet loss and perform load balancing and traffic monitoring functions. The programmable NIC 228 is used to monitor per-flow state information of network flows through the NIC. Per-flow state refers to the network state information that is maintained for individual network flows within a network device or system. A flow is a sequence of packets that share common attributes, such as source and destination IP addresses, source and destination port numbers, and the transport protocol (e.g., TCP or UDP). The programmable NIC 228 maintains per-flow state information that includes protocol used (e.g., TCP/IP), source and destination port and IP addresses, number of packets transmitted and received, and number of bytes transmitted and received for each connection established via the NIC. This information is used by the NIC 228 to facilitate various networking functions, such as routing, firewalling, Quality of Service (QOS) enforcement, and network monitoring.

The programmable NIC 228 is programmed to record connection summaries 236 for the connections, or flows, established via the NIC. An example schema 350 for connection summaries is shown in FIG. 2C. The connection summary schema 400 includes the local IP address and port number for a connection (i.e., flow), the remote IP address and port number for the connection, number of packets transmitted and received, number of bytes transmitted and received, and a time stamp at which information was last collected/updated. This information is recorded by the programmable NIC 228 for each connection and stored in a memory of the NIC. Connection summary data can be collected transparently from customers and with minimal impact on workloads. The collection agent 236 periodically retrieves the connection summaries 236 from the programmable NIC 228 and transmits the connection summaries to the graph generating component 304 of FIG. 3A.

Most large public clouds include thousands of VMs and numerous NICs that handle the traffic and generate connection summaries for these VMs. This can result in hundreds or thousands of records being created per minute. For example, the communication in cloud clusters, such as Portal, can result in over 300 records per minute while the communication in cloud clusters, such as userviceBench and K8s Paas, can result in approximately 50k and 70k records per minute, respectively. Due to the large number of VMs, the transmission of the telemetry (i.e., connection summaries) results in a stream of telemetry data that is to be processed by the graph generating component 304. The graph generating component 304 needs only a handful of resources (e.g., VMs) to process the incoming telemetry stream in order to generate the graphs. For example, in various implementations, a number of resources, or VMs needed to handle the telemetry stream to generate the graphs corresponds to approximately 0.5% of the total number of VMs that communicate in the network. This is roughly a 0.5% surcharge to enable detailed analysis of the communication in the system which is a relatively small increase in cost of goods sold (COGS) for the system.

Figure 4:
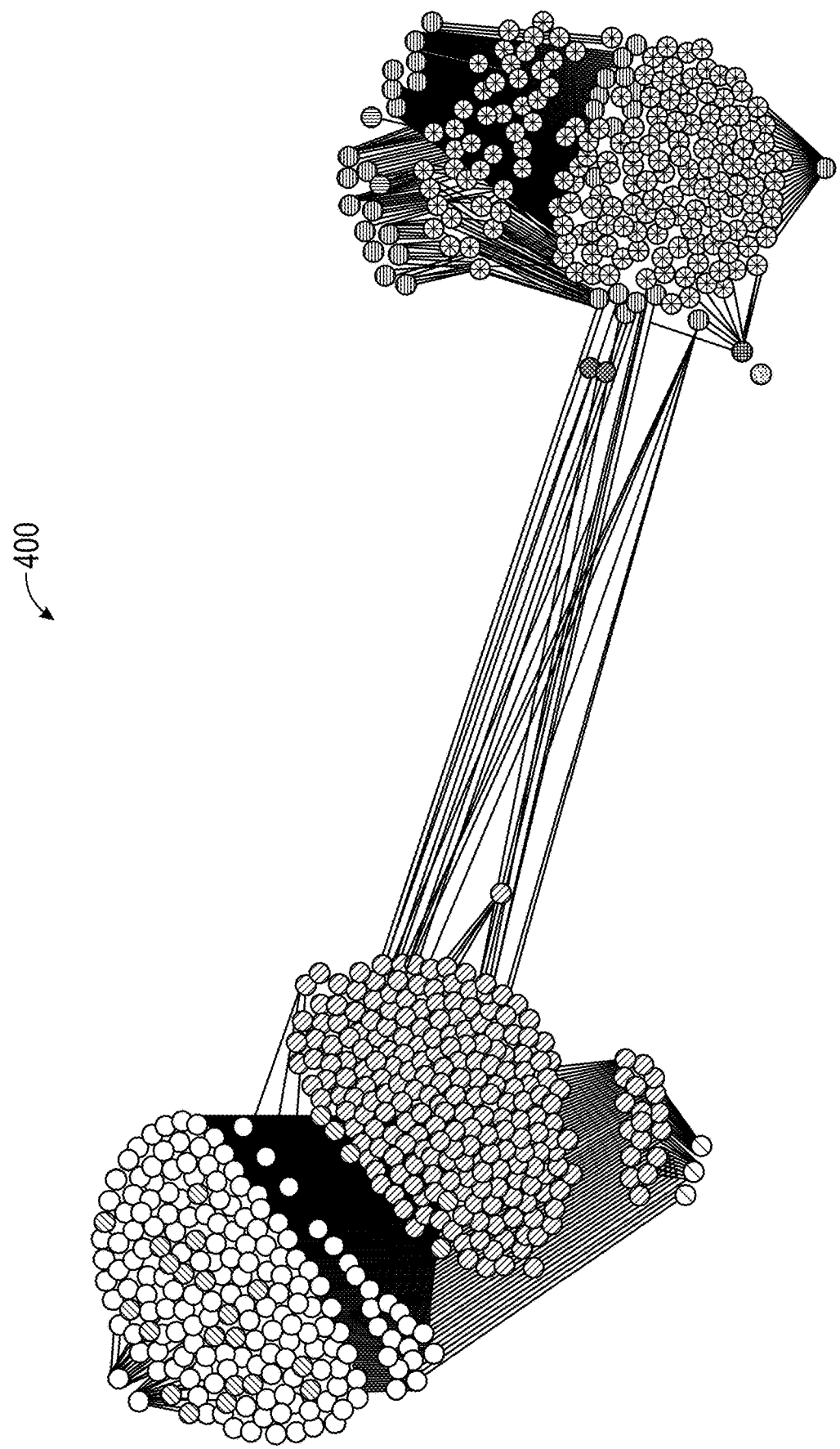
FIG. 4 shows an example communication graph for one hour of communication in a Kubernetes (K8s) Platform-as-a-Service (PaaS) cluster.
Figure 5:
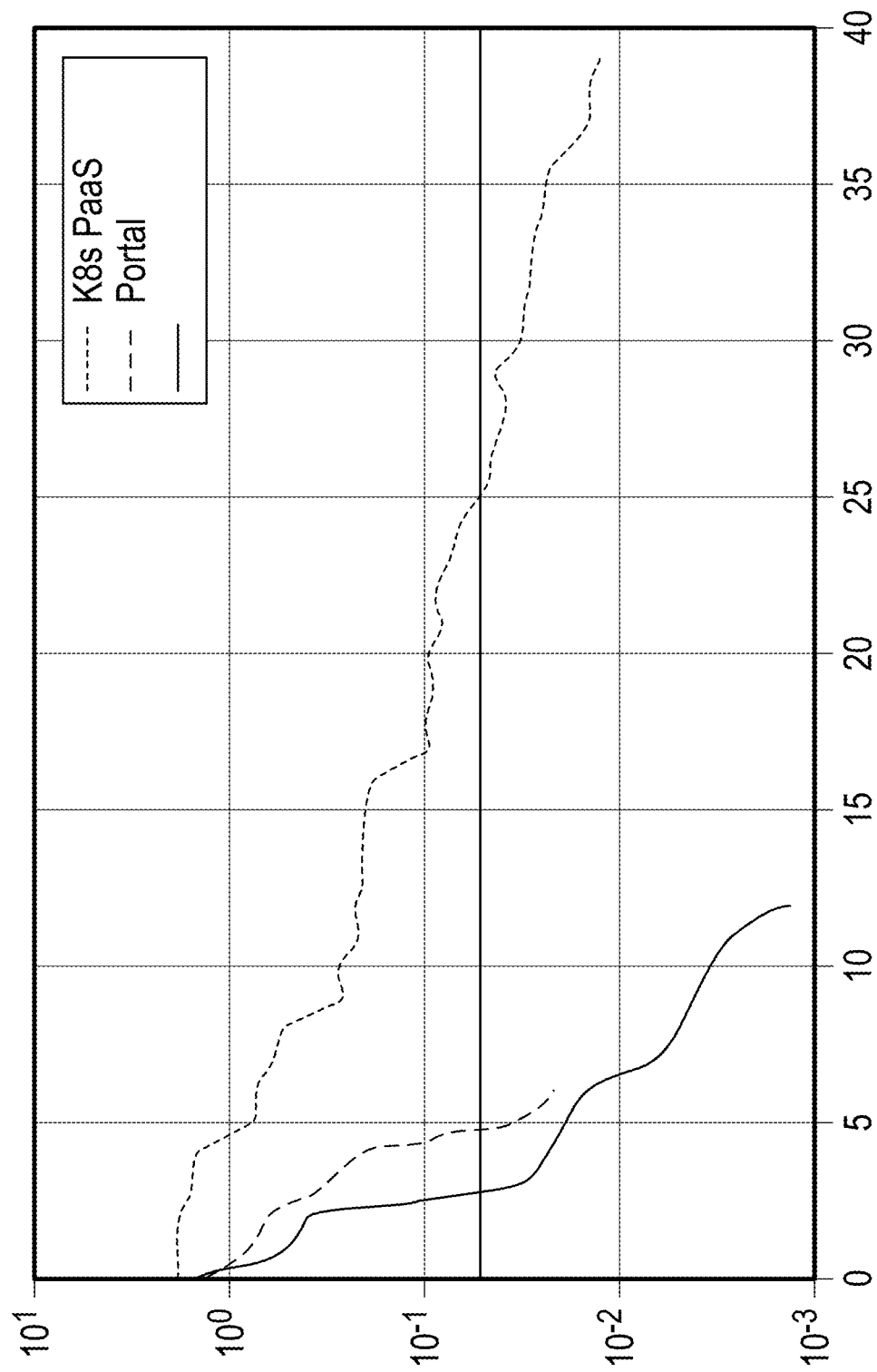
FIG. 5 shows an example graph that plots the reconstruction error when compressing a matrix using different numbers of principal components.

Returning to FIG. 3A, graph generating component 304 receives the connection summaries from collection agents 302 at each host and generates at least one communication graph 305. An example communication graph 400 is shown in FIG. 4. Each node in the connection graph corresponds to an IP address, service, Kubernetes pod, {(IP, port)} tuple, or the like. The graph 500 of FIG. 5 is a graph of one hour of communication in a K8s PaaS cluster. Each node therefore corresponds to a Kubernetes pod.

In various implementations, to generate communication graphs from a live stream of connection summaries, the graph generating component utilizes group-by-aggregation queries on the connection summaries. These queries accumulate the byte packet and connection counts for each pair of nodes between which communication connections have been established. The memory needed to process thousands of VMs worth of telemetry is proportional to the number of node pairs in the graph. Even though connectivity within a network may be sparse, there may be many remote IPs. Also, the number of nodes will grow if graph nodes also have port information in addition to IP addresses. As a result, the memory required to process all node pairs may be unreasonable. To mitigate the memory requirement that would otherwise be required to process thousands of VMs worth of telemetry, a top-K logic is used to reduce the numbers of nodes used to generate the graph. That is, all remote IPs and ephemeral ports that do not individually account for a sizable share of the computation can be collapsed into fewer nodes. For example, top-K logic can be used to collapse all nodes responsible for predetermined percentage, e.g., less than 0.1%, of bytes, packets, or connections into a single node. Such an approximation can enable streaming graph construction on subscriptions with thousands of VMs in a single machine.

Connection summaries are continuously updated (e.g., once a minute) and retrieved which enables dynamic views of the communication within a subscription. For example, time-series of graphs can be generated to show communications over time. Alternatively, time-series data can be embedded in the node and/or edge attributes of a graph. The graphs are capable of capturing information at different timescales and different granularities which enables a multi-faceted view of the internal communication that in turn enables discovery of meaningful patterns and rich analyses of data. As an alternative to the use of connection summaries to generate communication graphs, the system may be configured to use The ability to generate communication graphs with nodes and edges as described above enables various analytic techniques to be implemented by the analytics component 306 to characterize, manage, and control network communications in ways that may not otherwise be possible. One example of an analytics technique enabled by the communication graphs according to this disclosure is role-based auto-micro-segmentation. Micro-segmentation refers to the process of dividing resources into micro-segments and authoring reachability policies for controlling communication between the micro-segments. Micro-segmentation is used for fine granular protection of resources inside cloud subscriptions. Since a subscription can have multiple VMs, databases and other resources, the goal is to limit which other resources may become vulnerable when any one of the resources is breached. The number of other resources which may become vulnerable when a resource is breached is referred to as the blast radius. The default reachability policy between micro-segments is typically to deny communication. By doing so, the blast radius of breaching a resource is reduced to only those resources that must be communicated with during normal operation. Nodes can be segmented based on any suitable criteria. For example, nodes are often segmented based on role (e.g., worker, scheduler, manager, master, storage, compute, etc.).

Micro-segmentation is challenging for a few reasons. Previously known micro-segmentation required users to identify the roles of nodes and then manually tag each node with the appropriate micro-segment label. This is a time-consuming task which can be prone to errors. In addition, this process is made more difficult by the fact that the role of a resource can change, such as when pods in Kubernetes migrate or scale up or down or when a software change causes VMs to behave differently. Labels must be kept up to date with these changes.

Figure 3B:
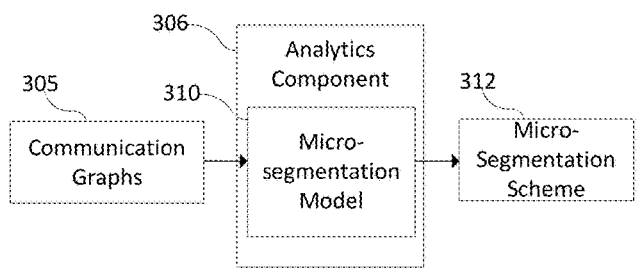
FIG. 3B shows an example implementation of automated micro-segmentation for the system of FIG. 3A.

The communication graphs generated according to this disclosure enable micro-segmentation processes to be automated based role. In particular, the communication graphs enable role-based auto-micro-segmentation of the nodes in a communication system by inferring roles of nodes based on how then nodes communicate, such as which neighbors each node communicates with and the nature of the communication (e.g., the time series and numbers of bytes, packets, and connections exchanged with each neighbor). Referring to FIG. 3B, role-based auto-micro-segmentation may be implemented by training a model 310 to identify nodes which have the same role, e.g., based on the connections between nodes and the parameters of the connections between nodes, based on the communication graphs 305 which are generated by the system. The model 310 can then generate a micro-segmentation scheme which identifies the roles of each node which are used as the basis for segmenting the nodes. Reachability policies may be predefined for roles and/or generated automatically based on the role and/or the nature of the communication associated with each role. FIG. 4 shows the result of a simple segmentation. In FIG. 4, nodes that share a color have the same role and can be placed into a u segment. Enforcing reachability between u segments imposes additional stress on network virtualization systems. Cloud systems today limit the number of rules that can execute on the path in and out of each VM (e.g., no more than 10^3 rules at a VM), and it is unclear how to scale enforcement when there are many resources and μ segment labels.

Referring again to FIG. 3A, the communication graphs described herein also enable principal component analysis (PCA) to be performed to generate succinct summaries of the flows which can provide useful information regarding the flows within the network. Cloud communication graphs are exceedingly sparse. Using PCA, a sparse transform of a matrix can be performed using just the first k eigen vectors. That is, for a square matrix M, PCA computes matrices E and D which represent the eigen vectors and eigen values on the diagonal such that $M=EDE^T$. If M has n rows, let $E_k$ be the n×k matrix containing just the first k eigen vectors, and let $D_k$ be the k×k matrix with just the first k eigen values. The kth sparse transform is then denoted as $M_k=E_k D_k E_k^T$. Reconstruction error ReconErr(M,$M_k$) is then computed as the normalized absolute sum of entries in $M-M_k$. Using all eigen vectors will perfectly recover a matrix. Therefore, $M_n=M$. However, as the graph in FIG. 5 shows, in all of the considered communication graphs, many fewer eigen vectors suffice for a low reconstruction error. For example, in the K8s PaaS dataset, using just k=25 eigen vectors (n>500 in this case) leads to less than 0.05 error. This means that on average each entry in the reconstructed matrix is within 5% of its true value.

Figure 7B:
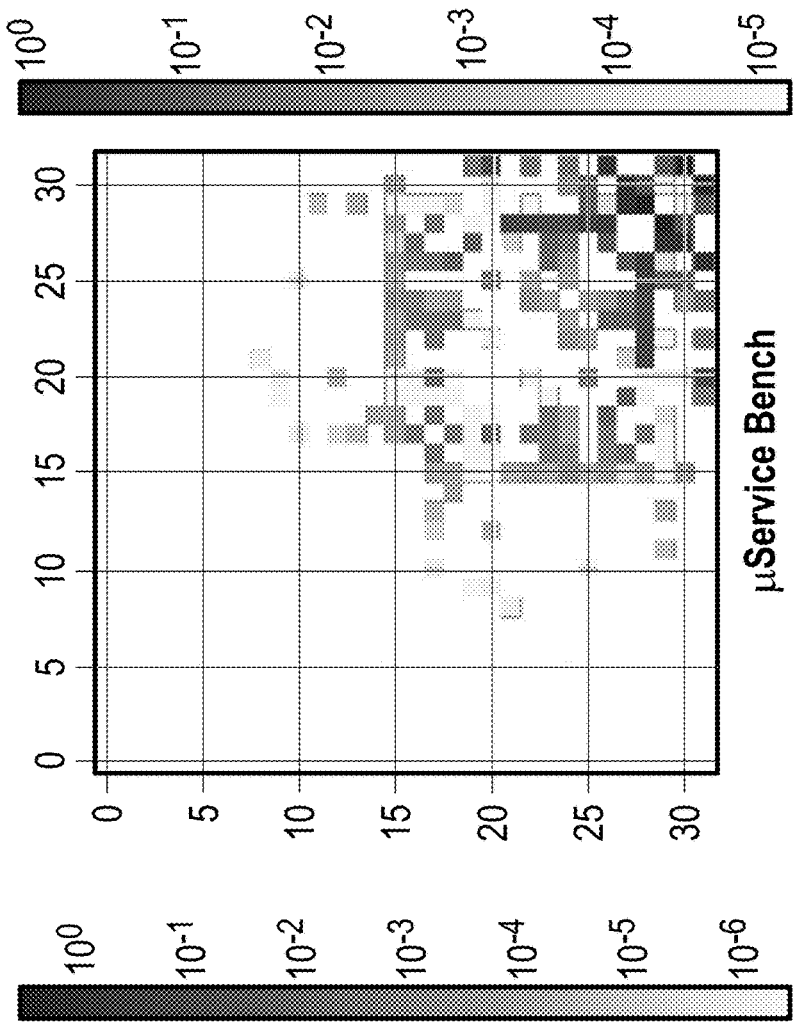
Figure 7A:
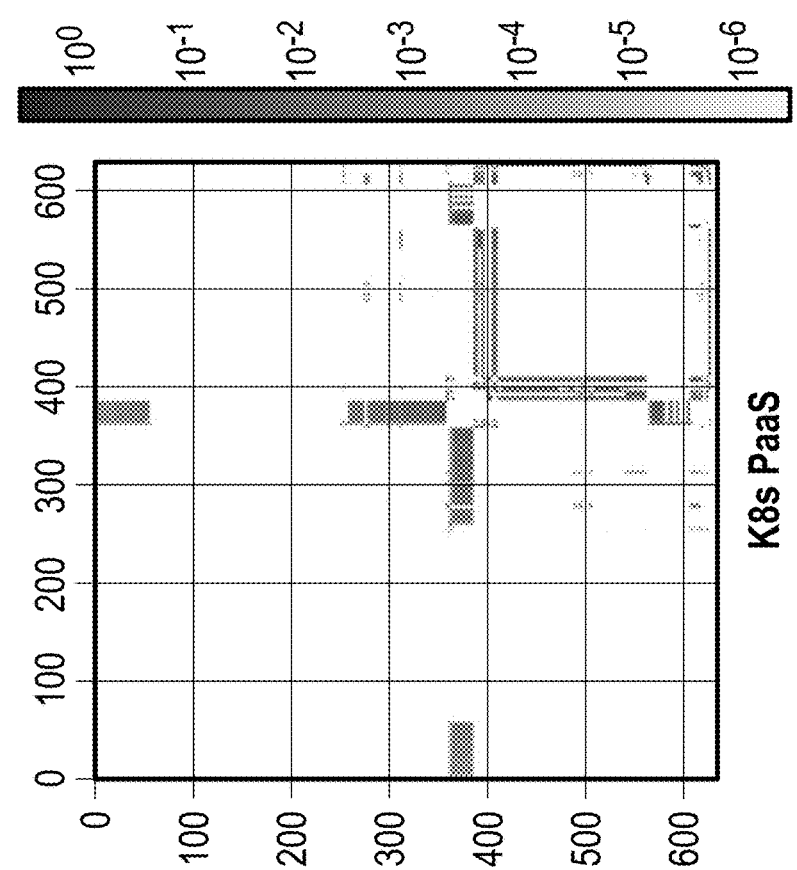

The adjacency matrices in FIGS. 7A-7C show that cloud communication graphs exhibit clear patterns. Rows and columns are IP addresses and the color of the matrix entries, in log scale, represent the amount of bytes that are exchanged. A few patterns are apparent, i.e., (1) chatty cliques, and (2) hub and spoke. Chatty clique patterns are found where subsets of nodes exchange large amounts of data among each other. Hub and spoke patterns can be found where some nodes exchange a large amount of data with many other nodes. Hubs are likely to be control plane components such as job managers or k8s API servers. Cloud stores and telemetry sinks may also appear as hubs. It should be noted that similar patterns exist across graphs from different subscriptions, likely due to the commonality of software practices.

Figure 3C:
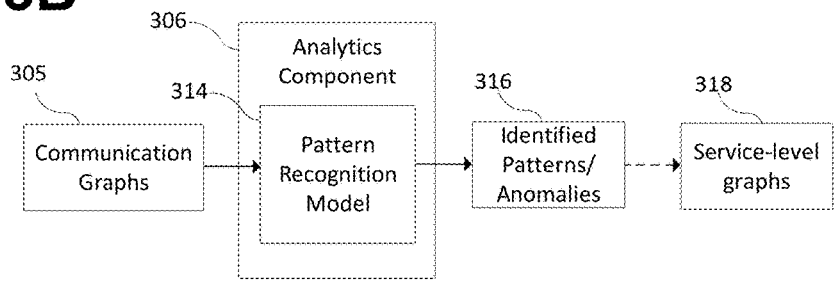
FIG. 3C shows an example implementation of automated communication pattern/anomaly identification for the system of FIG. 3A.

By performing PCA of time-series communication graphs, characteristics patterns indicative of communication anomalies may be identified. Consider FIGS. 8A-8C which show the matrices for three subsequent hours after the matrix in FIG. 7A on the K8s PaaS dataset. While there are some changes from graph to graph, e.g., some bands shrink or grow in intensity and a few appear only during some hours, many patterns are consistent. Therefore, during times when pattern consistency is expected, uncharacteristic changes in the pattern can be identified as communication anomalies. Referring to FIG. 3C, a pattern identification model 314 may be trained over many communication graphs to identify canonical patterns and anomalies 316 in the communication graphs 305, as described above.

Certain communication patterns may therefore be useful in determining various types of information pertaining to nodes. This information can be used for various purposes, such as providing executive summaries of network traffic, e.g., "80% of the bytes in your network are doing X." Certain communication patterns may also facilitate determination of roles and/or services implemented by nodes. The communication graphs therefore enable information to be determined which can be used to characterize the nodes (e.g., roles, services, and the like) and/or communication between nodes (e.g., patterns, anomalies) to be detected based on header information only (e.g., source and destination addresses/ports) without having to access the packet. The model can be trained to identify such characteristic patterns and changes in patterns automatically. In various implementations, the identified patterns/anomalies 316 can be processed to generate service-level communication graphs 318. Such graphs can be analyzed to determine other useful information regarding the network. For example, service-level graphs can be analyzed to identify characteristic patterns and anomalies in microservice interactions.

Figure 3D:
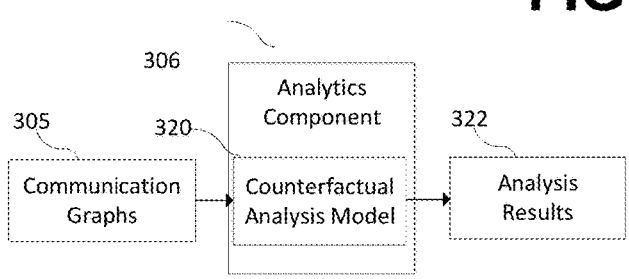
FIG. 3D shows an example implementation of automated counterfactual analysis for the system of FIG. 3A.
Figure 6:
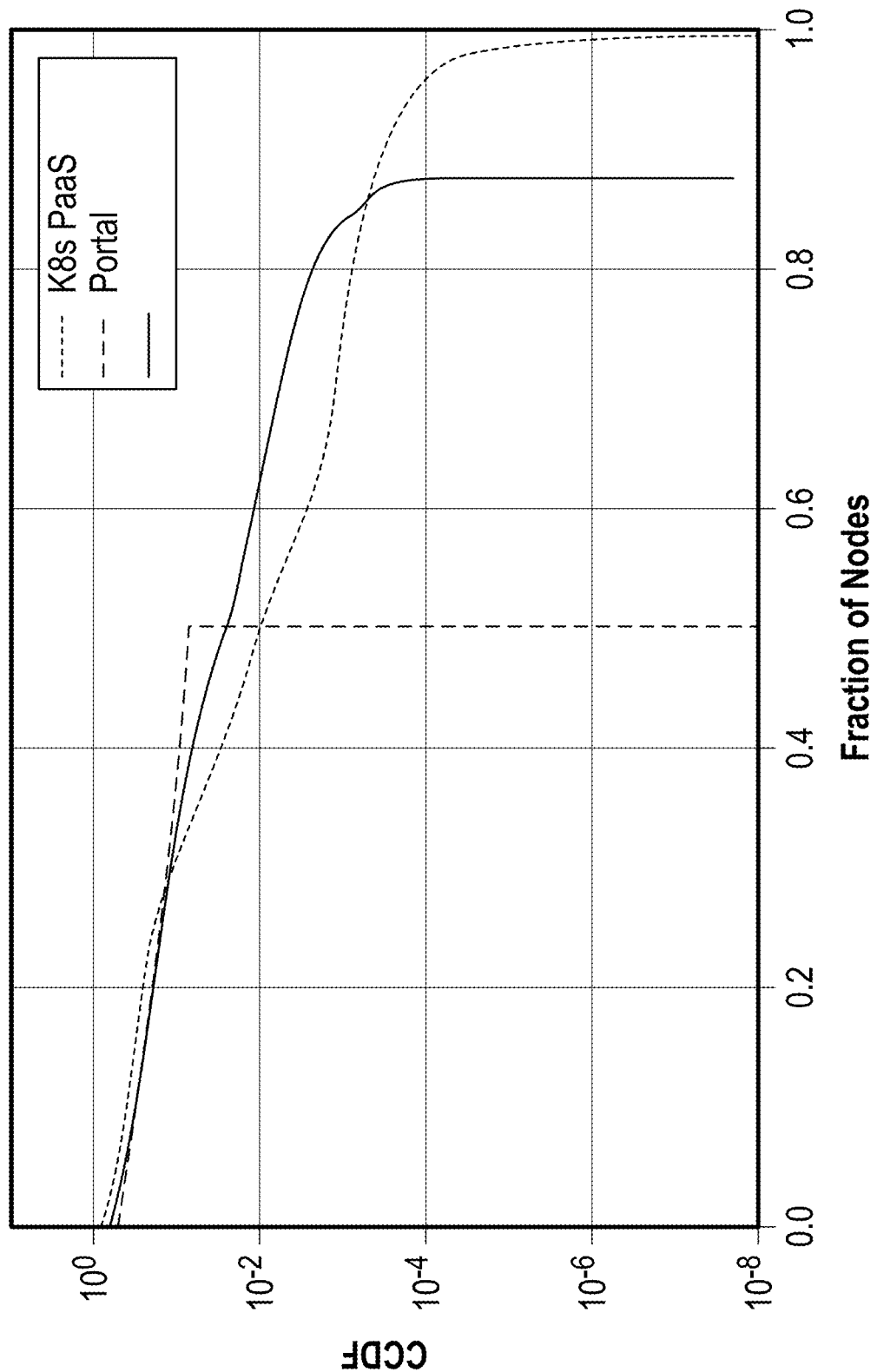
FIG. 6 depicts a graph showing CCDF of all the bytes exchanged in a communication graph verses the number of nodes participating in the exchange.

The analytics component 306 may also be used to perform counterfactual analysis of communication graphs. For example, referring to FIG. 3D, a model 320 can be trained to perform counterfactual analysis on the communication graphs to generate an output 322 which depends on the type of analysis performed. Connection summaries already contain distributions of flow sizes and inter-arrival distributions (quantized to the frequency of summaries). Thus, a communication graph dataset can enable rich counterfactual reasoning. For example, counterfactual analysis may be performed to estimate flow completion time distributions based on flow size and arrival information. The graph of FIG. 6 describes a simpler analysis that involves determining where communication bottlenecks are located in a cloud subscription. The graph shows the complementary cumulative distribution function (CCDF) of all the bytes exchanged in a communication graph versus the number of nodes participating in the exchange. The graph of FIG. 6 shows that, in all of the traces, substantial fractions of traffic go in/out of just a few nodes. This analysis can show an administrator where to invest more capacity (by changing the VM SKU), and to suggest to an administrator to relocate VMs that exchange a lot of data into the same availability zone or a proximity group to improve performance.

The communication analytics system includes a user interface component 308 via which communication graphs and other information derived from analysis of communication graphs can be presented to a user. The user interface 308 also enables users to provide inputs for specifying parameters for analysis, such as analysis techniques to use, and to provide inputs that may be required by the system, such as login information which may be required to access subscription information.

Figure 9:
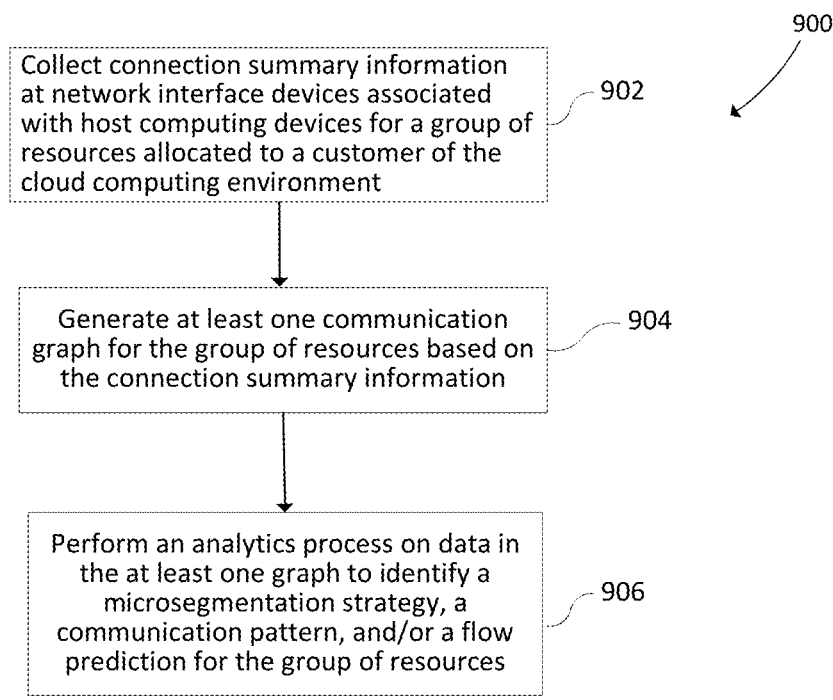
FIG. 9 is a flowchart of an example method of generating communication graphs for subscriptions in a public cloud.

FIG. 9 is a flowchart of an example method 900 for securing and optimizing communications in a cloud computing environment. The method includes collecting connection summary information at network interface devices associated with host computing devices for a group of resources allocated to a customer of the cloud computing environment (block 902). The connection summary information includes local address information, remote address information, and data information for each connection established via the network interface devices. The connection summary information is then used as the basis for generating at least one communication graph for the group of resources (block 904). Communication graphs include nodes that represent communication resources of the group of resources and edges extending between nodes that characterize communication between the nodes. An analytics process is then performed on the at least one communication graph to identify at least one of a micro-segmentation strategy, a communication patterns/anomalies, and a flow prediction for the group of resources (block 906).

Figure 10:
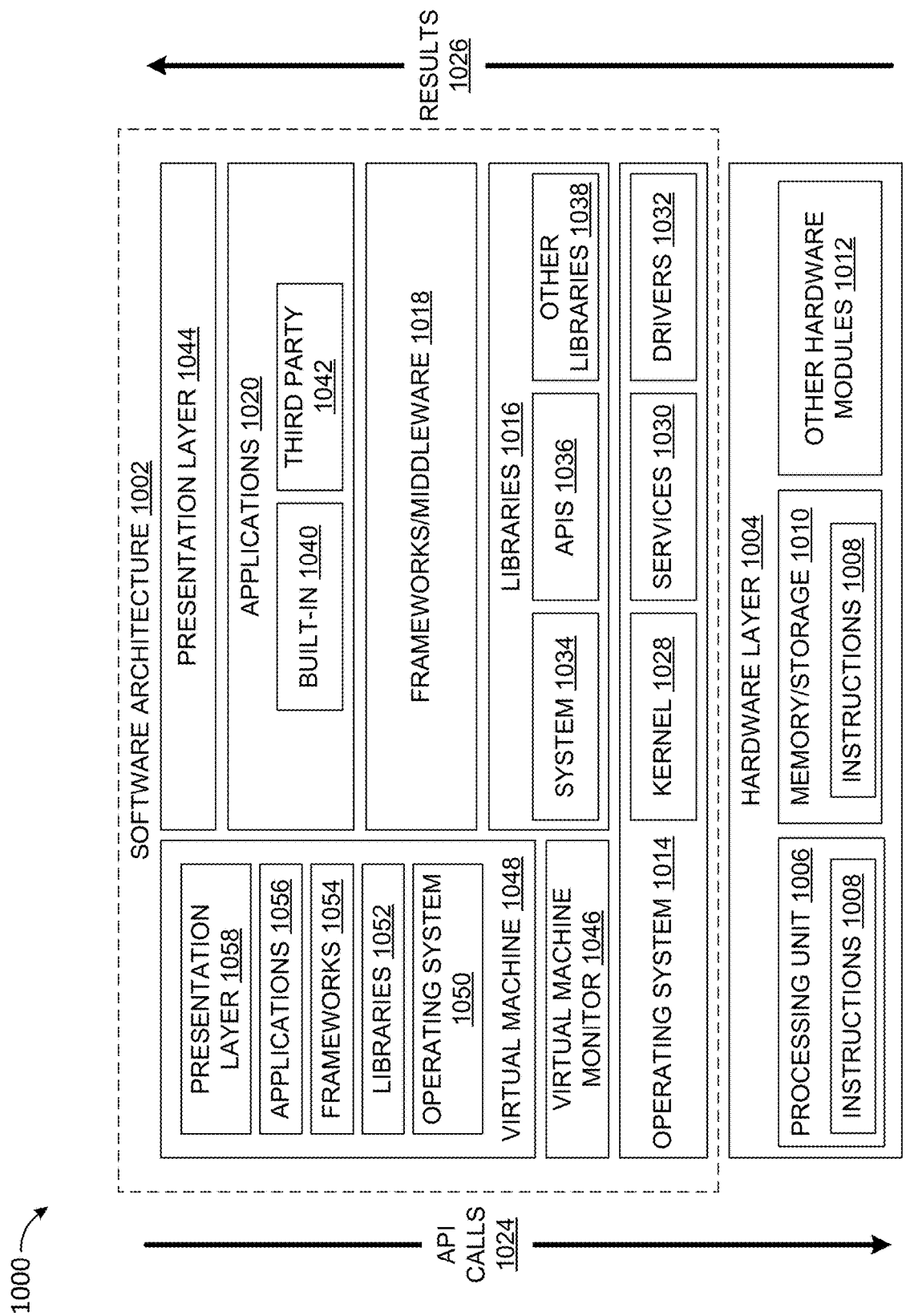
FIG. 10 is a block diagram showing an example software architecture, various portions of which may be used in conjunction with various hardware architectures herein described, which may implement any of the described features.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
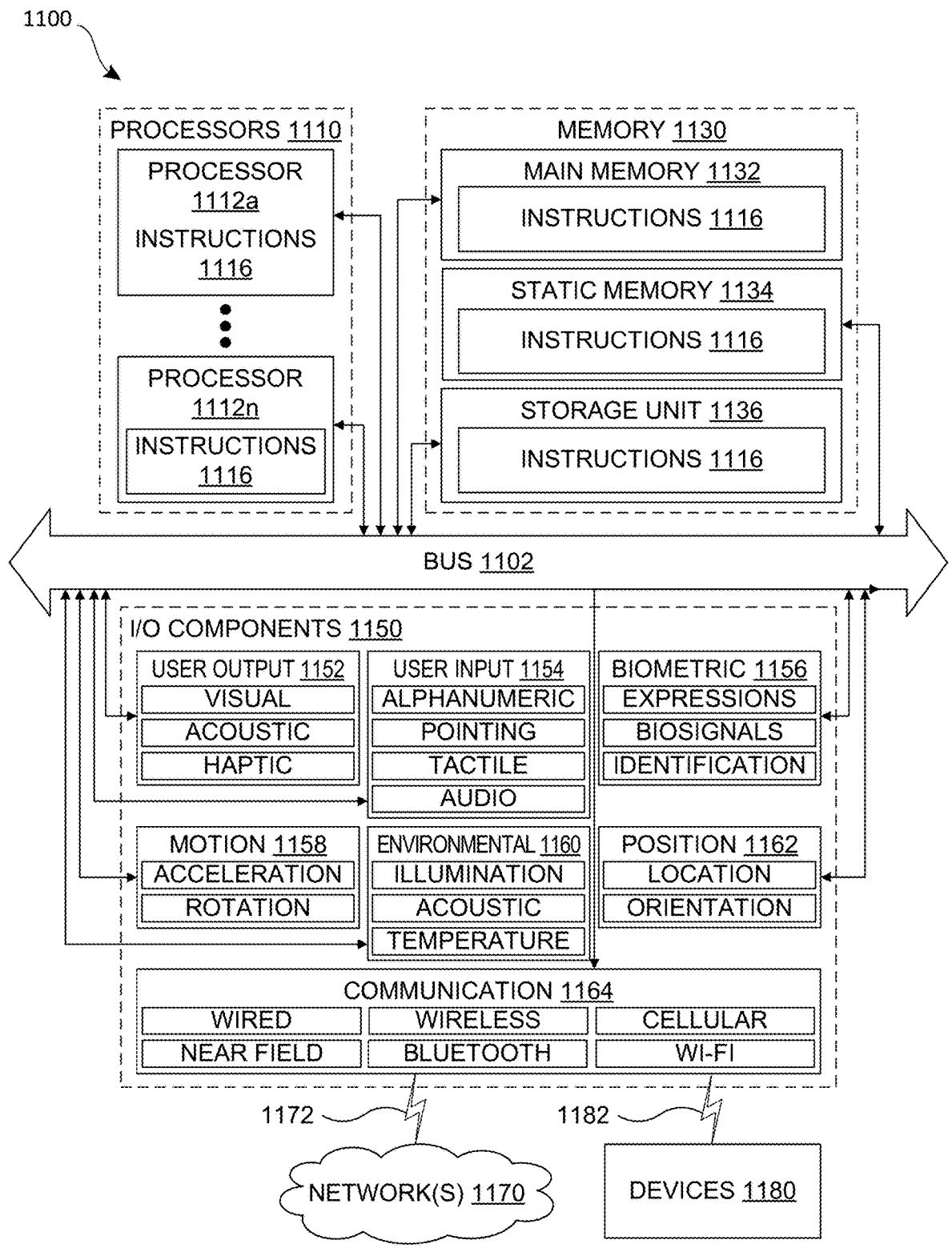
FIG. 11 is a block diagram showing components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1164, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A communication analytics system for a cloud computing environment, the communication analytics system comprising:
  a processor; and
  a memory in communication with the processor, the memory comprising executable instructions that, when executed by the processor alone or in combination with other processors, cause the communication analytics system to perform functions of:
- using network interface devices of host computing devices for a group of resources allocated to a customer of the cloud computing environment to monitor connections established via the network interface devices and record connection summary information for each of the connections, the connection summary information including local address information, remote address information, and data information for each the connections;
- generating at least one communication graph for the group of resources using the connection summary information, the at least one communication graph including nodes that represent communication resources of the group of resources and edges extending between nodes that characterize communication between the nodes; and
- performing at least one analytics process on data in the at least one communication graph, the analytics process including at least one of a micro-segmentation strategy, a principal component analysis, and a counterfactual analysis.

Item 2. The communication analytics system of item 1, wherein the connection summary information for a connection includes:
- the local address information includes a local IP address and a local port number for the connection,
- the remote address information includes a remote IP address and a remote port number for the connection, and
- the data information indicates a number of packets and a number of bytes transmitted and received via the network interface device for the connection.

Item 3. The communication analytics system of any of items 1-2, wherein the network interface devices are programmable network interface cards (NICs), the programmable NICs including counters for tracking the number of packets and the number of bytes for the connections.

Item 4. The communication analytics system of any of items 1-3, wherein performing the at least one analytics process includes providing the at least one communication graph to a machine learning model as input, the machine learning model being trained to perform the at least one of the micro-segmentation analysis, the principal component analysis, and the counterfactual analysis of the at least one communication graph and to output a result of the at least one of the micro-segmentation analysis, the principal component analysis, and the counterfactual analysis.

Item 5. The communication analytics system of any of items 1-4, wherein the micro-segmentation analysis includes:
- using the machine learning model to automatically identify roles for the node in the at least one communication graph based on characteristics of communications between node pairs and dividing the nodes into micro-segments based on the roles, and
- determining reachability policies for controlling how communication between micro-segments is handled.

Item 6. The communication analytics system of any of items 1-5, wherein the principal component analysis includes:
- using the machine-learning model to perform the principal component analysis of the at least one communication graph to identify predetermined communication patterns/anomalies; and
- generating a summary of at least one characteristic of network traffic based on the principal component analysis; and
- displaying the summary on a display of a computing device.

Item 7. The communication analytics system of any of items 1-6, wherein the principal component analysis includes:
- using the machine-learning model to perform the principal component analysis of the at least one communication graph to identify microservices implemented by the nodes; and
- generating a service-level communication graph based on the identified microservices.

Item 8. The communication analytics system of any of items 1-7, wherein the counterfactual analysis includes:
- using the machine-learning model to estimate flow completion time distributions based on flow size and arrival information from the at least one communication graphs.

Item 9. The communication analytics system of any of items 1-8, wherein the connection summary information is retrieved from the network interface devices at regular intervals by agents which are executed on the host computing devices, the agents being programmed to retrieve the connection summary information and transmit the connection summary information to a graph generating component which generates the at least one communication graph.

Item 10. A method of graphing and analyzing communications across a cloud service provider, the method comprising:
- using network interface devices of host computing devices for a group of resources allocated to a customer of the cloud computing environment to monitor connections established via the network interface devices and record connection summary information for each of the connections, the connection summary information including local address information, remote address information, and data information for each the connections;
- generating at least one communication graph for the group of resources using the connection summary information, the at least one communication graph including nodes that represent communication resources of the group of resources and edges extending between nodes that characterize communication between the nodes; and
- performing at least one analytics process on data in the at least one communication graph, the analytics process including at least one of a micro-segmentation strategy, a principal component analysis, and a counterfactual analysis.

Item 11. The method of item 10, wherein the connection summary information for a connection includes:
- the local address information includes a local IP address and a local port number for the connection,
- the remote address information includes a remote IP address and a remote port number for the connections, and
- the data information indicates a number of packets and a number of bytes transmitted and received via the network interface device for the connection.

Item 12. The method of any of items 10-11, wherein the network interface devices are programmable network interface cards (NICs), the programmable NICs including counters for tracking the number of packets and the number of bytes for the connections.

Item 13. The method of any of items 10-12, wherein performing the at least one analytics process includes providing the at least one communication graph to a machine learning model as input, the machine learning model being trained to perform the at least one of the micro-segmentation analysis, the principal component analysis, and the counterfactual analysis of the at least one communication graph and to output a result of the at least one of the micro-segmentation analysis, the principal component analysis, and the counterfactual analysis.

Item 14. The method of any of items 10-13, wherein the micro-segmentation analysis includes:
  using the machine learning model to automatically identify roles for the node in the at least one communication graph based on characteristics of communications between node pairs and dividing the nodes into micro-segments based on the roles, and
  determining reachability policies for controlling how communication between micro-segments is handled.

Item 15. The method of any of items 10-14, wherein the communication pattern/anomaly identification includes:
  using the machine-learning model to perform principal component analysis of the at least one communication graph to identify predetermined communication patterns/anomalies; and
  generating a summary of at least one characteristic of network traffic based on the principal component analysis; and
  displaying the summary on a display of a computing device.

Item 16. The method of any of items 10-15, wherein the communication pattern/anomaly identification includes:
  using the machine-learning model to perform principal component analysis of the at least one communication graph to identify microservices implemented by the nodes; and
  generating a service-level communication graph based on the identified microservices.

Item 17. The method of any of items 10-16, wherein the counterfactual analysis includes:
  using the machine-learning model to estimate flow completion time distributions based on flow size and arrival information from the at least one communication graphs.

Item 18. The method of any of items 10-17, wherein the connection summary information is retrieved from the network interface devices at regular intervals by agents which are executed on the host computing devices, the agents being programmed to retrieve the connection summary information and transmit the connection summary information to a graph generating component which generates the at least one communication graph.

Item 19. A non-transitory computer readable medium on which are stored instructions that, when executed by a processor, cause a programmable device to perform functions of:
  using network interface devices of host computing devices for a group of resources allocated to a customer of the cloud computing environment to monitor connections established via the network interface devices and record connection summary information for each of the connections, the connection summary information including local address information, remote address information, and data information for each the connections;
  generating at least one communication graph for the group of resources using the connection summary information, the at least one communication graph including nodes that represent communication resources of the group of resources and edges extending between nodes that characterize communication between the nodes; and
  performing at least one analytics process on data in the at least one communication graph to identify at least one of a micro-segmentation strategy, a principal component analysis, and a counterfactual analysis.

Item 20. The non-transitory computer readable medium of item 19, wherein the network interface devices are programmable network interface cards (NICs), the programmable NICs including counters for tracking the number of packets and the number of bytes for the connections.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of graphing and analyzing communications across a cloud service provider, the method comprising:
   using network interface devices of host computing devices for a group of resources allocated to a customer of the cloud service provider to monitor connections established via the network interface devices and record connection summary information for each of the connections, the connection summary information including local address information, remote address information, and data information for each the connections;
   generating at least one communication graph for the group of resources using the connection summary information, the at least one communication graph including nodes that represent communication resources of the group of resources and edges extending between nodes that characterize communication between the nodes; and
   performing at least one analytics process on data in the at least one communication graph, the analytics process including at least one of a micro-segmentation strategy, a principal component analysis, and a counterfactual analysis.

2. The method of claim 1, wherein the connection summary information for a connection includes:
   the local address information includes a local IP address and a local port number for the connection,
   the remote address information includes a remote IP address and a remote port number for the connections, and
   the data information indicates a number of packets and a number of bytes transmitted and received via the network interface device for the connection.

3. The method of claim 2, wherein the network interface devices are programmable network interface cards (NICs), the programmable NICs including counters for tracking the number of packets and the number of bytes for the connections.

4. The method of claim 1, wherein performing the at least one analytics process includes providing the at least one communication graph to a machine learning model as input, the machine learning model being trained to perform the at least one of the micro-segmentation analysis, the principal component analysis, and the counterfactual analysis of the at least one communication graph and to output a result of the at least one of the micro-segmentation analysis, the principal component analysis, and the counterfactual analysis.

5. The method of claim 4, wherein the micro-segmentation analysis includes:
   using the machine learning model to automatically identify roles for the node in the at least one communication graph based on characteristics of communications between node pairs and dividing the nodes into micro-segments based on the roles, and
   determining reachability policies for controlling how communication between micro-segments is handled.

6. The method of claim 4, wherein the principal component analysis includes:
   using the machine learning model to perform principal component analysis of the at least one communication graph to identify predetermined communication patterns/anomalies; and
   generating a summary of at least one characteristic of network traffic based on the principal component analysis; and
   displaying the summary on a display of a computing device.

7. The method of claim 4, wherein the principal component analysis includes:
   using the machine learning model to perform principal component analysis of the at least one communication graph to identify microservices implemented by the nodes; and
   generating a service-level communication graph based on the identified microservices.

8. The method of claim 4, wherein the counterfactual analysis includes:
   using the machine learning model to estimate flow completion time distributions based on flow size and arrival information from the at least one communication graphs.

9. The method of claim 1, wherein the connection summary information is retrieved from the network interface devices at regular intervals by agents which are executed on the host computing devices, the agents being programmed to retrieve the connection summary information and transmit the connection summary information to a graph generating component which generates the at least one communication graph.

10. A non-transitory computer readable medium on which are stored instructions that, when executed by a processor, cause a programmable device to perform functions of:
    using network interface devices of host computing devices for a group of resources allocated to a customer of a cloud computing environment to monitor connections established via the network interface devices and record connection summary information for each of the connections, the connection summary information including local address information, remote address information, and data information for each the connections;

generating at least one communication graph for the group of resources using the connection summary information, the at least one communication graph including nodes that represent communication resources of the group of resources and edges extending between nodes that characterize communication between the nodes; and performing at least one analytics process on data in the at least one communication graph to identify at least one of a micro-segmentation strategy, a principal component analysis, and a counterfactual analysis.

11. The non-transitory computer readable medium of claim 10, wherein the network interface devices are programmable network interface cards (NICs), the programmable NICs including counters for tracking a number of packets and a number of bytes for the connections.

12. A communication analytics system for a cloud computing environment, the communication analytics system comprising:

a processor; and a memory in communication with the processor, the memory comprising executable instructions that, when executed by the processor alone or in combination with other processors, cause the communication analytics system to perform functions of:

using network interface devices of host computing devices for a group of resources allocated to a customer of the cloud computing environment to monitor connections established via the network interface devices and record connection summary information for each of the connections, the connection summary information including local address information, remote address information, and data information for each the connections;

generating at least one communication graph for the group of resources using the connection summary information, the at least one communication graph including nodes that represent communication resources of the group of resources and edges extending between nodes that characterize communication between the nodes; and performing at least one analytics process on data in the at least one communication graph, the analytics process including at least one of a micro-segmentation strategy, a principal component analysis, and a counterfactual analysis.

13. The communication analytics system of claim 12, wherein the connection summary information for a connection includes:

the local address information includes a local IP address and a local port number for the connection, the remote address information includes a remote IP address and a remote port number for the connection, and the data information indicates a number of packets and a number of bytes transmitted and received via the network interface device for the connection.

14. The communication analytics system of claim 13, wherein the network interface devices are programmable network interface cards (NICs), the programmable NICs including counters for tracking the number of packets and the number of bytes for the connections.

15. The communication analytics system of claim 12, wherein performing the at least one analytics process includes providing the at least one communication graph to a machine learning model as input, the machine learning model being trained to perform the at least one of the micro-segmentation analysis, the principal component analysis, and the counterfactual analysis of the at least one communication graph and to output a result of the at least one of the micro-segmentation analysis, the principal component analysis, and the counterfactual analysis.

16. The communication analytics system of claim 15, wherein the micro-segmentation analysis includes:

using the machine learning model to automatically identify roles for the node in the at least one communication graph based on characteristics of communications between node pairs and dividing the nodes into micro-segments based on the roles, and determining reachability policies for controlling how communication between micro-segments is handled.

17. The communication analytics system of claim 15, wherein the principal component analysis includes:

using the machine learning model to perform the principal component analysis of the at least one communication graph to identify predetermined communication patterns/anomalies; and generating a summary of at least one characteristic of network traffic based on the principal component analysis; and displaying the summary on a display of a computing device.

18. The communication analytics system of claim 15, wherein the principal component analysis includes:

using the machine learning model to perform the principal component analysis of the at least one communication graph to identify microservices implemented by the nodes; and generating a service-level communication graph based on the identified microservices.

19. The communication analytics system of claim 15, wherein the counterfactual analysis includes:

using the machine learning model to estimate flow completion time distributions based on flow size and arrival information from the at least one communication graphs.

20. The communication analytics system of claim 12, wherein the connection summary information is retrieved from the network interface devices at regular intervals by agents which are executed on the host computing devices, the agents being programmed to retrieve the connection summary information and transmit the connection summary information to a graph generating component which generates the at least one communication graph.

* * * * *